United States Patent
Chou et al.

(10) Patent No.: US 7,821,225 B2
(45) Date of Patent: Oct. 26, 2010

(54) HYBRID POWER SUPPLY AND POWER MANAGEMENT METHOD THEREOF

(75) Inventors: Yuh-Fwu Chou, Hsinchu County (TW); Chiou-Chu Lai, Hsinchu (TW); Sheng-Yong Shen, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 494 days.

(21) Appl. No.: 11/362,065

(22) Filed: Feb. 27, 2006

(65) Prior Publication Data

US 2006/0197382 A1 Sep. 7, 2006

(30) Foreign Application Priority Data

Mar. 4, 2005 (TW) .............................. 94106561 A

(51) Int. Cl.
*H01M 10/46* (2006.01)
(52) U.S. Cl. .................. 320/103; 320/107; 320/128
(58) Field of Classification Search .............. 320/103, 320/104, 107, 118, 119, 127, 128
See application file for complete search history.

(56) References Cited

U.S. PATENT DOCUMENTS

| | | | | |
|---|---|---|---|---|
| 6,144,187 A | * | 11/2000 | Bryson | 320/137 |
| 6,300,744 B1 | * | 10/2001 | Shum | 320/137 |
| 6,414,403 B2 | * | 7/2002 | Kitagawa et al. | 307/66 |
| 6,590,370 B1 | | 7/2003 | Leach | |
| 6,867,568 B1 | * | 3/2005 | Olson et al. | 320/162 |
| 7,199,558 B2 | * | 4/2007 | Solie et al. | 320/137 |
| 2004/0195996 A1 | * | 10/2004 | Nishida | 320/103 |
| 2005/0258798 A1 | * | 11/2005 | Meier-Engel | 320/107 |
| 2006/0001406 A1 | * | 1/2006 | Matan | 320/166 |
| 2006/0063044 A1 | * | 3/2006 | DeVries | 429/9 |

FOREIGN PATENT DOCUMENTS

JP 11341699 12/1999
JP 2002-034171 1/2002

* cited by examiner

*Primary Examiner*—Bao Q Vu
*Assistant Examiner*—Nguyen Tran
(74) *Attorney, Agent, or Firm*—Birch, Stewart, Kolasch & Birch, LLP

(57) ABSTRACT

The invention provides a power management method for a hybrid power supply, comprising providing a primary power source, providing a rechargeable battery, providing a DC-DC converter, acquiring an amount of the power stored in the rechargeable battery, and when the energy level of the rechargeable battery does not exceed a first predetermined value, the DC-DC converter controls the primary power source to output a first value of a first electrical parameter.

17 Claims, 19 Drawing Sheets

HYBRID POWER SUPPLY AND POWER MANAGEMENT METHOD THEREOF

BACKGROUND OF THE INVENTION

1. Field of the Invention

The present invention relates to a power supply and a power management method thereof, and more particularly to a hybrid power supply and a power management method thereof.

2. Description of the Related Art

Fuel cell batteries have been identified as a clean, highly efficient means of energy storage and a means for converting energy to useable electricity. Methanol fuel cells in particular have been identified not only as a means of storing energy and converting stored energy to electricity but also as part of a renewable (as opposed to exhaustible) energy system based on methanol. When the fuel cell battery outputs at maximum power, however, the low conversion efficiency of the fuel cell battery decreases the numbers of hour fuel cell battery can be used. Thus, a hybrid power supply comprising a fuel cell battery is desirable.

FIG. 1 is a schematic diagram of a conventional hybrid power supply 10. In FIG. 1, fuel cell battery 11 provides electric energy to a DC-DC converter 12. An output voltage of an operational amplifier 16, determined by a divide voltage V of the rechargeable battery 13 and a reference voltage Vref, is transmitted to a control unit 15. The control unit 15 transmits a control signal 17 based on the output voltage of an operational amplifier 16 to the DC-DC converter 12 for adjusting the output voltage Vout of DC-DC converter 12. When the maximum power of the fuel cell battery 11 is not sufficient to power the DC-DC converter 12 to provide sufficient power to the loader 14, the voltage of the fuel cell battery 11 decreases until power failure occurs. To avoid power failure, a power management method for the hybrid power supply 10 is desirable.

FIG. 2 is a schematic diagram of a conventional hybrid power supply of U.S. Pat. No. 6,590,370. A status value of the fuel cell battery 21 and a reference voltage Vref are used to generate a feedback signal for adjusting the electric energy derived by the DC-DC converter 22 from the fuel cell battery 21. Thus, the conversion efficiency of the fuel cell battery 21 increases and the probability of power failure decreases. The output current of the fuel cell battery 21 is affected by the concentration of the fuel and the temperature of the fuel cell battery 21. In this embodiment, a feedback mechanism and a rechargeable battery 23 are applied to control the current derived by the DC-DC converter 22 from the fuel cell battery 21 to maintain the output voltage of the fuel cell battery 21. When the rechargeable battery 23 is at full charge or the voltage of the rechargeable battery 23 is equal to a cutoff voltage, however, the rechargeable battery 23 can no longer adjust the fuel cell battery 21 and may damage the rechargeable battery 23.

FIG. 3 is a schematic diagram of a conventional hybrid power supply of U.S. Pat. No. 6,590,370. A control signal $V_{CONTROL}$ is generated from the operational amplifier 32 receiving an output voltage of fuel cell battery 31 and a reference voltage $V_{REF}$. The DC-DC converter 33 is a boost-type DC-DC power converter, wherein in this embodiment, the DC-DC converter 33 is made of a MAXIM chip (chip number: MAX1701) and other required elements. When the rechargeable battery 36 is at full charge, the rechargeable battery 36 might be damaged if the fuel cell battery 31 is still outputting the power to the rechargeable battery 36. Thus, the U.S. Pat. No. 6,590,370 provides a protection circuit 35 to protect the rechargeable battery. When the voltage of the rechargeable battery 36 is equal to a charge cutoff voltage, i.e. the secondary is at full charge, only a few volts are transmitted to the rechargeable battery 36 and the remaining voltage is transmitted to the protection circuit 35. The protection circuit 35 converts the remaining voltage into heat for diffusion. Although, the problem of the rechargeable battery 36 is solved, the wasted energy of the fuel cell battery 31 and heat generated by the protection circuit causes new issues. Furthermore, when the power stored in the rechargeable battery 36 is exhausted, the hybrid power supply fails.

BRIEF SUMMARY OF THE INVENTION

A detailed description is given in the following embodiments with reference to the accompanying drawings.

The invention provides a power management method and system for a hybrid power supply and more particularly to a power management method and system utilizing the power stored in the primary power source and the rechargeable battery as the control factors.

The invention provides a power management method for a hybrid power supply, comprising providing a rechargeable battery, providing a primary power source, providing a DC-DC converter, acquiring an amount of the power stored in the rechargeable battery, and when the energy level of the rechargeable battery does not exceed a first predetermined value, the DC-DC converter controls the primary power source to output a first value of a first electrical parameter.

The invention provides a hybrid power supply device comprising a primary power source, a rechargeable battery, a control unit, and a DC-DC converter. The primary power source has an output terminal. The rechargeable battery has a second output terminal. The control unit acquires an electrical state of the primary power source and a energy level of the rechargeable battery to output a control signal. The DC-DC converter has a first input terminal coupled to the output terminal of the primary power source, a first output terminal coupled to the input terminal of the rechargeable battery, a control terminal receiving the control signal from the control unit to perform a power management procedure, comprising when the energy level of the rechargeable battery does not exceed a first predetermined value, the DC-DC converter controlled by the control unit controls the primary power source to output a first value of a first electrical parameter.

The invention provides a hybrid power supply device comprising a primary power source, an input measurement unit, a rechargeable battery, an output measurement unit, a control unit and a DC-DC converter. The input measurement unit electrically connected to the primary power source outputs a first signal according to a first electrical parameter of the primary power source. The rechargeable battery has one or a plurality of secondary cell units. The output measurement unit electrically connected to the rechargeable battery outputs a second signal according to a second electrical parameter of the rechargeable battery. The control unit receives the first signal and the second signal to output a third signal, wherein the third signal is one of the first and the second signals. The DC-DC converter is electrically connected to the primary power source and the rechargeable battery, wherein an input of the DC-DC converter has the first electrical parameter and an output voltage of the DC-DC converter is adjusted based on the third signal. When the energy level of the rechargeable battery does not exceed a first predetermined value, the DC-DC converter controls the primary power source to output a first value of the first electrical parameter based on the third signal, when the energy level of the rechargeable battery exceeds a first predetermined value, the DC-DC converter outputs a second voltage based on the third signal.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a power management method for a hybrid power supply comprising: providing a rechargeable battery; providing a primary power source; providing a DC-DC converter; acquiring a power stored in the rechargeable battery; when the energy level of the rechargeable battery does not exceed a first predetermined value, the DC-DC converter controls the primary power source to output a first value of a first electrical parameter.

Figure 1:
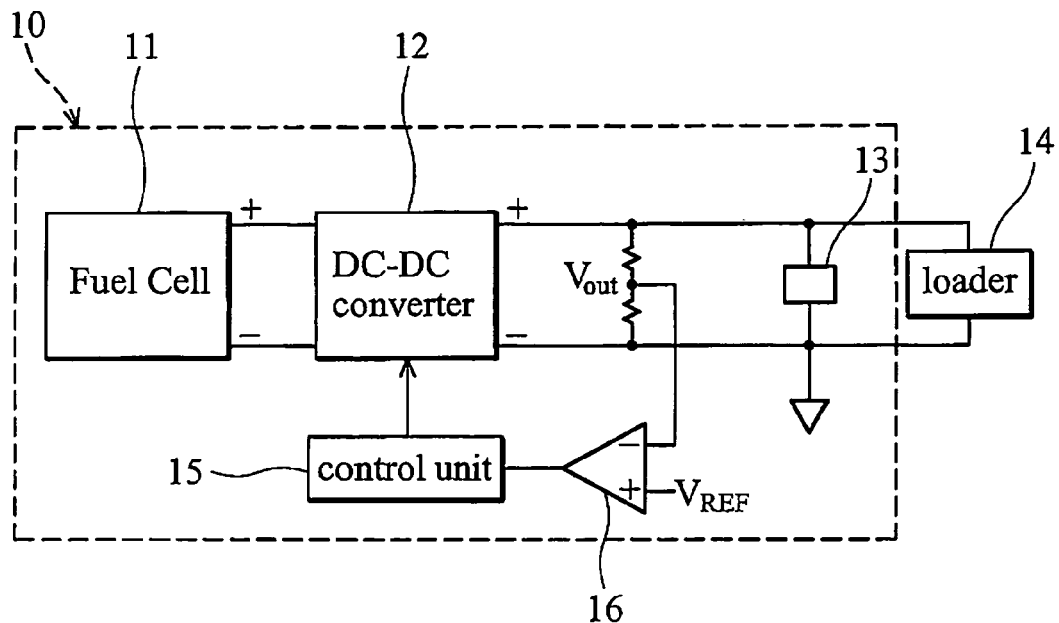
FIG. 1 is a schematic diagram of a conventional hybrid power supply 10.
Figure 2:
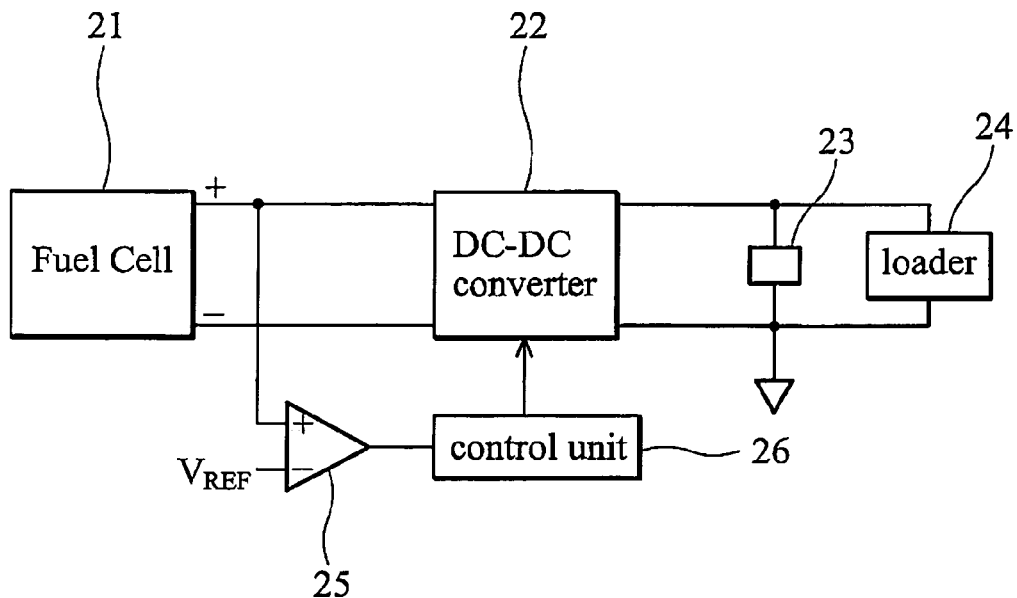
FIG. 2 is a schematic diagram of a conventional hybrid power supply of U.S. Pat. No. 6,590,370.
Figure 3:
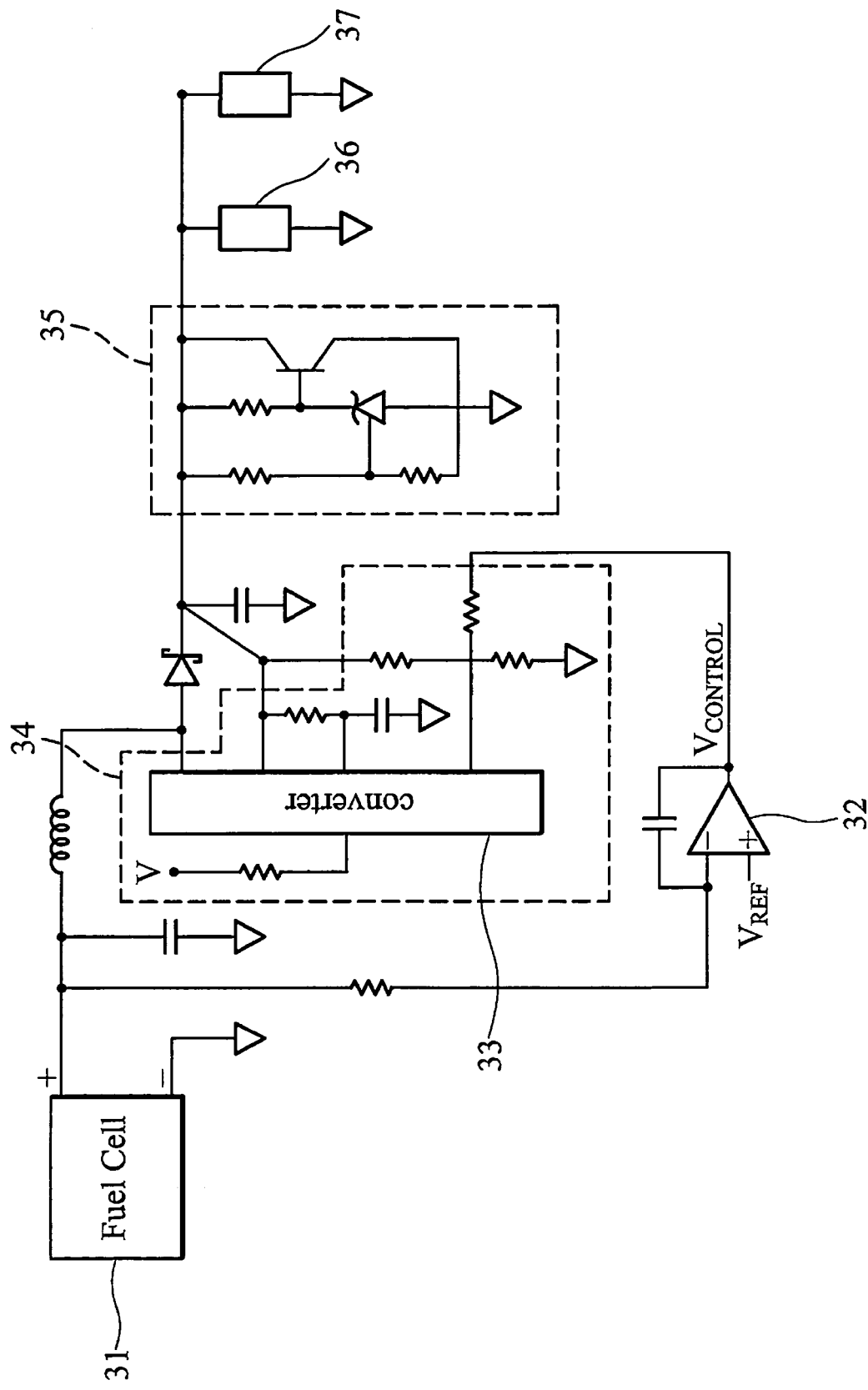
FIG. 3 is a schematic diagram of a conventional hybrid power supply of U.S. Pat. No. 6,590,370.
Figure 4A:
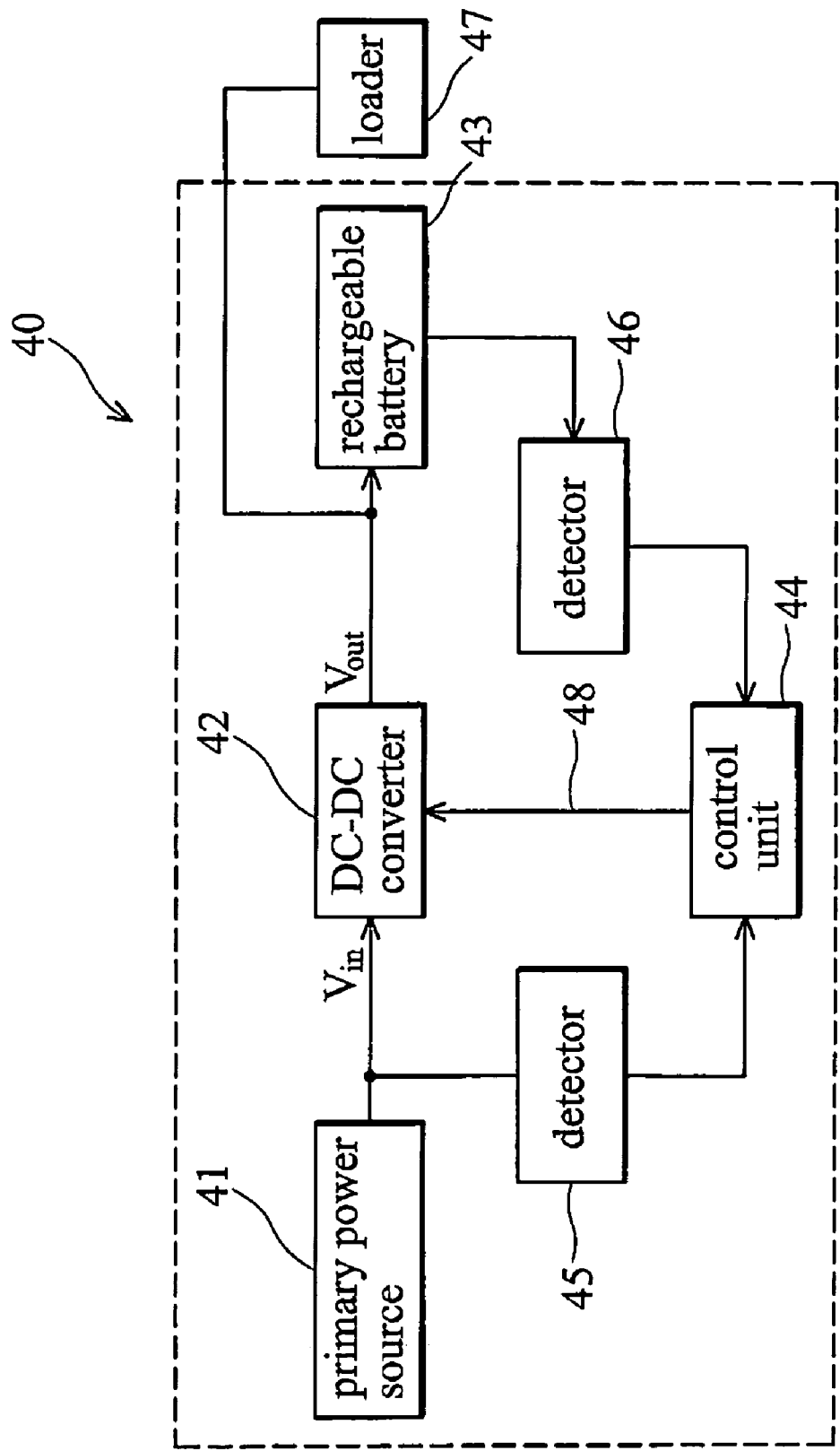
FIG. 4a is a schematic diagram of an embodiment of a hybrid power supply 40 connected to a loader 47 of the invention.

FIG. 4a is a schematic diagram of an embodiment of a hybrid power supply 40 connecting to a loader 47 of the invention. The detectors 45 and 46 respectively detect and transform the state values, such as voltage, current and else, of the primary power source 41 and the rechargeable battery 43 into voltage signal. The control unit 44 outputs a control signal 48 to the DC-DC converter 42 based on the voltage signals, and then the input voltage Vin and the output voltage Vout of the DC-DC converter 42 are adjusted based on the control signal 48. When the voltage of the rechargeable battery 43 does not exceed a first predetermined value, the primary power source 41 outputs a first voltage to the DC-DC converter 42 according to the control signal 48 from the control unit 44. When the voltage of the rechargeable battery 43 exceeds a second predetermined value, the DC-DC converter 42 outputs a second voltage according to the control signal 48 from the control unit 44. When the voltage of the rechargeable battery 43 is between the first predetermined value and the second predetermined value, the primary power source increases the voltage output to the DC-DC converter 42 according to the control signal 48 from the control unit 44.

Figure 4B:
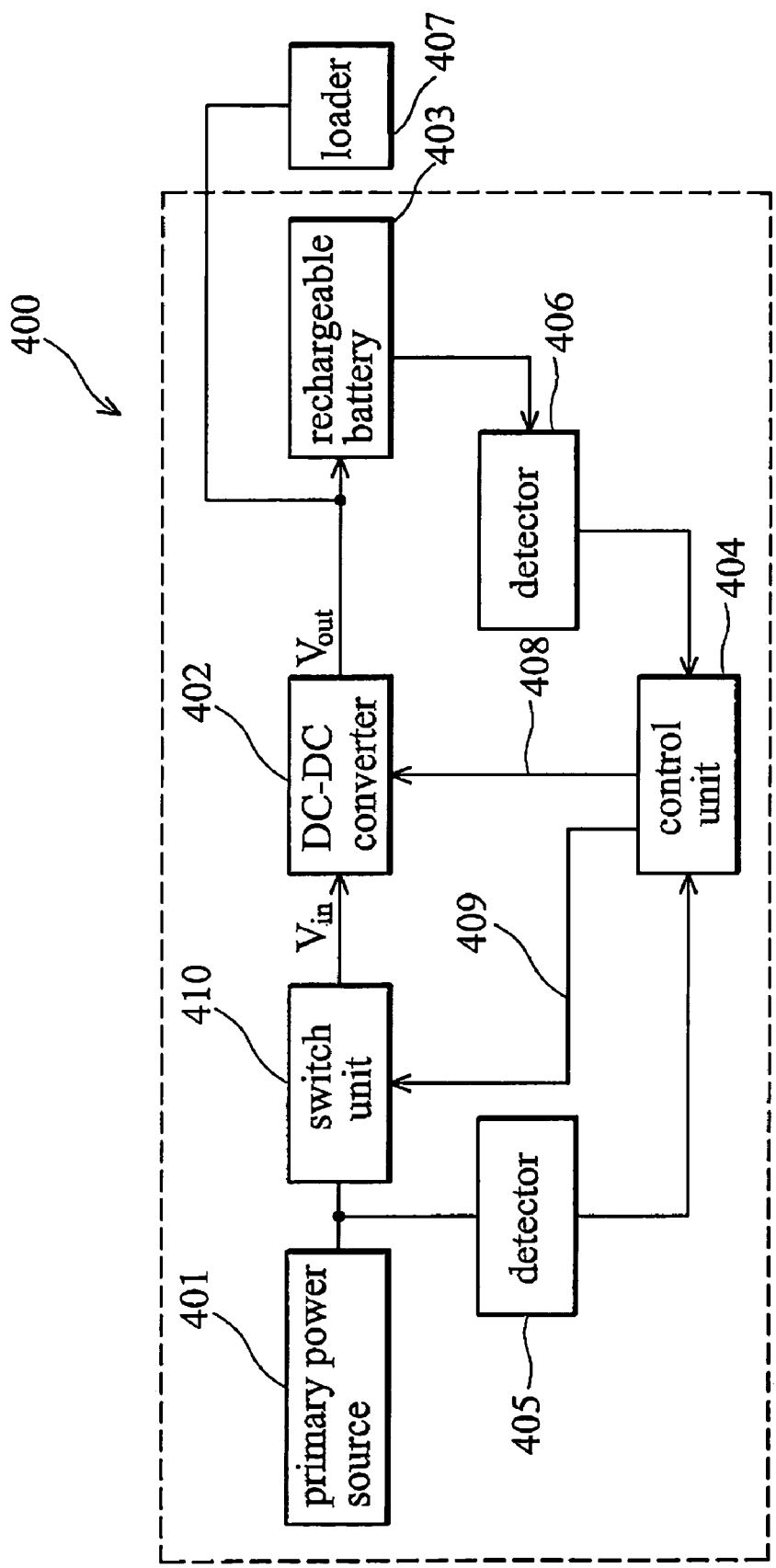
FIG. 4b is a schematic diagram of an embodiment of a hybrid power supply 400 connected to a loader 407 of the invention.

FIG. 4b is a schematic diagram of an embodiment of a hybrid power supply 400 connected to a loader 407 of the invention. The detectors 405 and 406 respectively detect and transform the state values, such as voltage, current and others, of the primary power source 401 and the rechargeable battery 403 into voltage signals. The control unit 44 outputs a first control signal 408 to the DC-DC converter 402 based on the voltage signals, and the input voltage Vin and the output voltage Vout of the DC-DC converter 42 are then adjusted based on the control signal 48. The switch unit 410 determines whether the primary power source 401 outputs electric energy to the DC-DC converter 402 according to the control signal 409. When the voltage of the rechargeable battery 403 does not exceed a first predetermined value, the primary power source 401 outputs a first voltage to the DC-DC converter 402 according to the control signal 408 from the control unit 404. When the voltage of the rechargeable battery 403 exceeds a second predetermined value, the switch unit 410 breaks the energy transmission between the primary power source 410 and the DC-DC converter 402 according to the control signal 409 from the control unit 404 until the voltage of the rechargeable battery 403 does not exceed the second predetermined value. When the voltage of the rechargeable battery 403 is between the first predetermined value and the second predetermined value, the primary power source 401 increases the voltage output to the DC-DC converter according to the control signal 408 from the control unit 404.

In the invention, the primary power source is formed by one or a plurality of fuel cells or solar cells, and the second battery is formed by one or plurality of Lithium-ion secondary batteries, Ni—H secondary batteries, Lead-acid batteries or the combination thereof. In the following description of the disclosure, the primary power source is a fuel cell battery and the rechargeable battery is a Lithium-ion rechargeable battery, wherein the fuel cell battery is formed of by thirty two cascading direct methanol fuel cells (DMFCs) and the rechargeable battery is formed by three cascading Lithium-ion cells.

Figure 5:
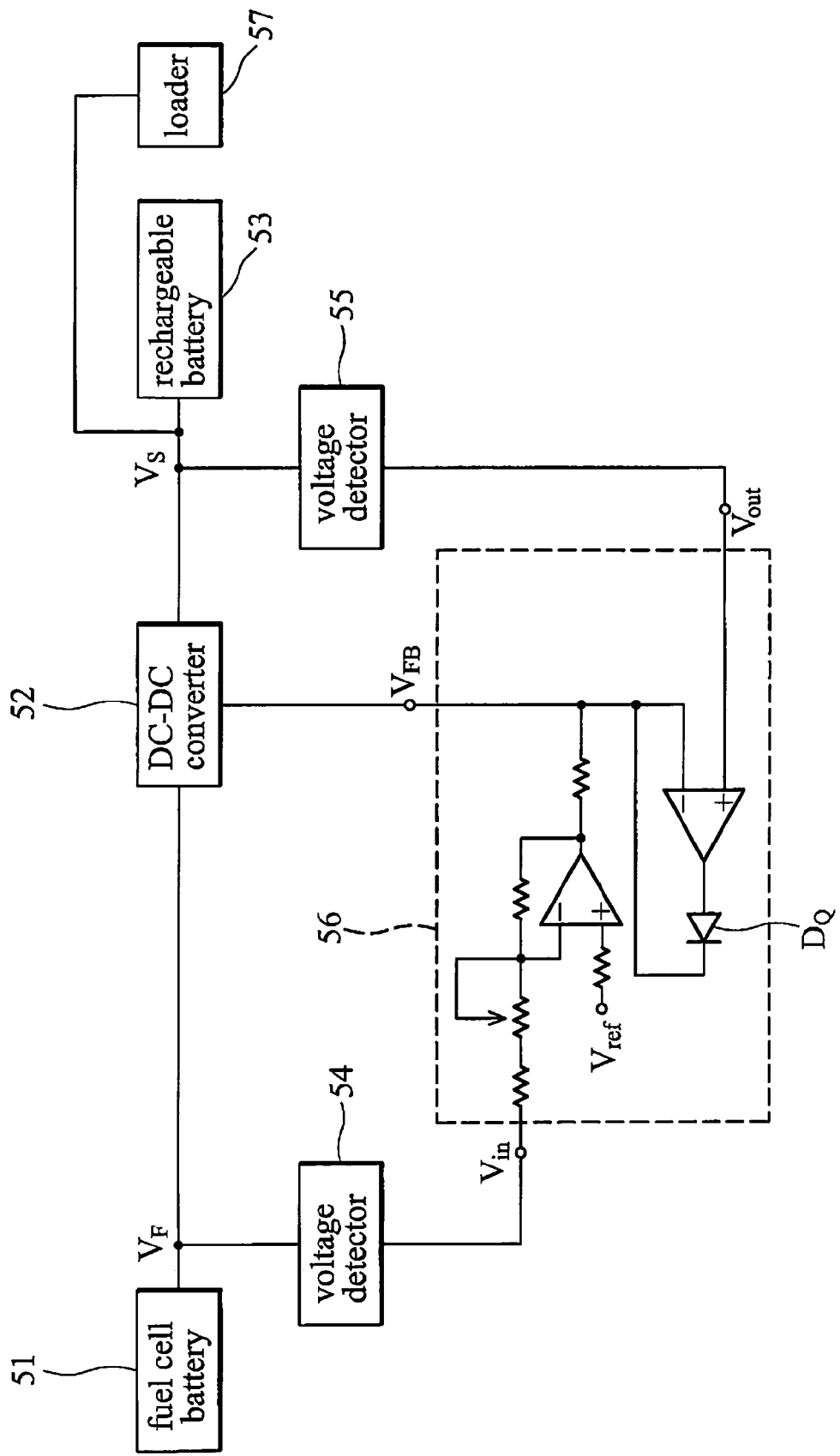
FIG. 5 is a schematic diagram of an embodiment of the hybrid power system of the invention.

Please refer to FIG. 5. FIG. 5 is a schematic diagram of another embodiment of the hybrid power system of the invention. In this embodiment, the circuit of the control unit 56 is merely an example for illustration, and is not intended to limit the control unit 56. The voltage measurement unit 54 detects and transforms the voltage $V_F$ of the fuel cell battery 51 into a voltage signal Vin, and the voltage measurement unit 55 detects and transforms the voltage $V_S$ of the rechargeable battery 53 into a voltage signal Vout. In this embodiment, $V_F$ is equal to Vout.

When the voltage $V_S$ exceeds 12.25V, the at full charge voltage of the rechargeable battery 53, the voltage signal Vout exceeds 2.5V, the predetermined reference voltage Vref, thus, the diode D0 turns on and the feedback voltage $V_{FB}$ is equal to Vout. Then, the fuel cell battery 51 decreases the electric energy output to the DC-DC converter 52 according to the feedback voltage $V_{FB}$ until the voltage of rechargeable battery 53 does not exceed 12.25V. When the voltage of rechargeable battery 53 does not exceed 12.25V the diode D0 turns off and the feedback voltage $V_{FB}$ is controlled by Vin. When the Vin is equal to 8V, the lowest working voltage of the fuel cell battery 51, the fuel cell battery 51 has the worst acceptable conversion efficiency of the fuel cell battery 51 and the feedback voltage $V_{FB}$ is equal to 2.5V. When Vin increases, the feedback voltage $V_{FB}$ decreases and the fuel cell battery 51 increases the electric energy output to the DC-DC converter 52 to decrease the voltage of the fuel cell battery 51 until the feedback voltage $V_{FB}$ is equal to 2.5V. In this embodiment, when the rechargeable battery 53 is of full charge, the voltage $V_F$ of the fuel cell battery 51 varies with the power of the loader 57 and the DC-DC converter outputs a constant voltage. When the secondary is not of full charge, the fuel cell battery 51 outputs a predetermined voltage having the maximum power to rapidly charge the rechargeable battery 53.

Figure 6:
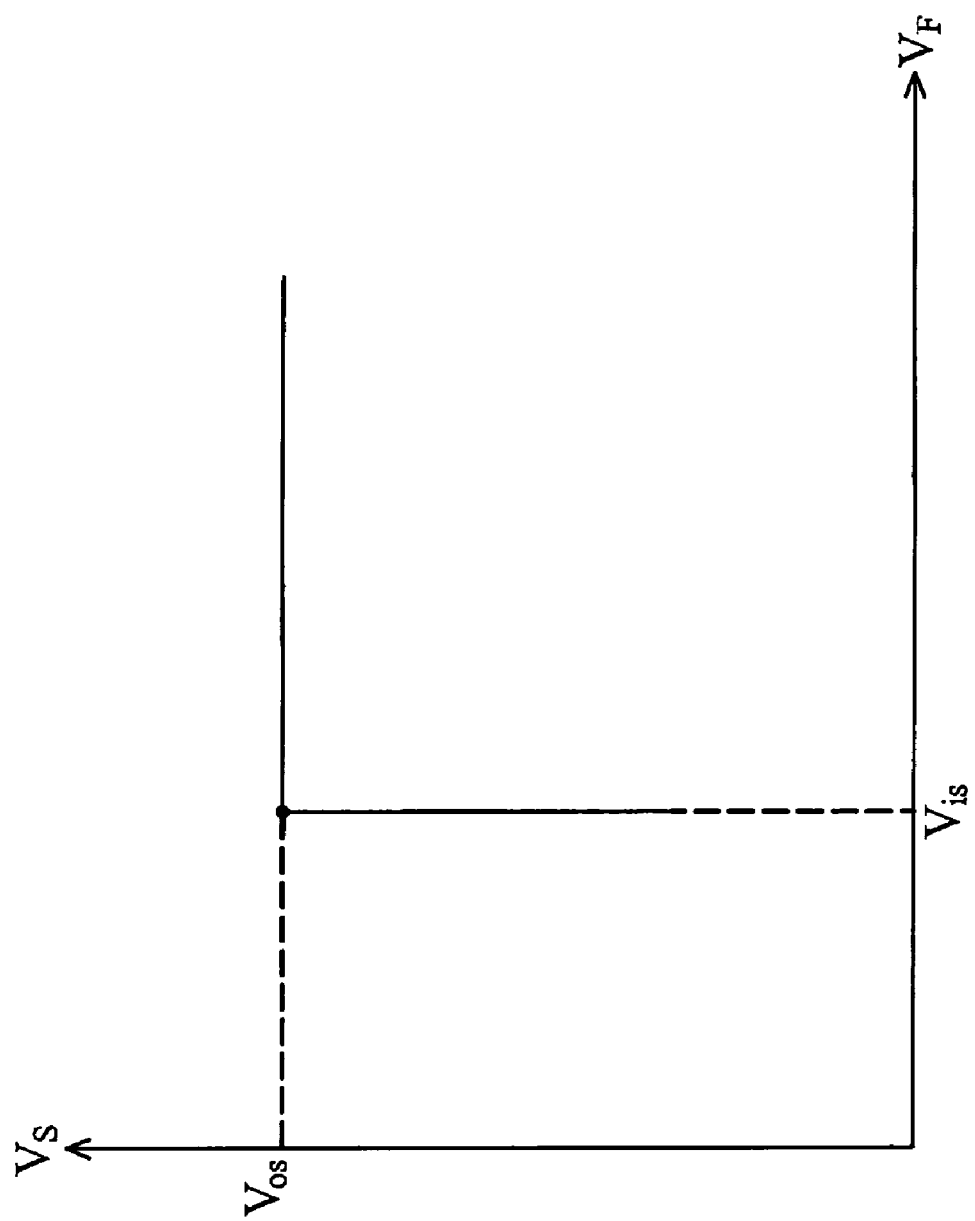
FIG. 6 is a schematic diagram of the variation of the voltage $V_F$ of the fuel cell battery 51 and the voltage $V_S$ of the rechargeable battery 53 of FIG. 5.

FIG. 6 is a schematic diagram of the variation of the voltage $V_F$ of the fuel cell battery 51 and the voltage $V_S$ of the rechargeable battery 53 of FIG. 5, wherein voltage Vos is a cutoff voltage of the rechargeable battery 53, i.e. the at full charge voltage of the rechargeable battery 53, and voltage Vis is a predetermined lowest voltage of the fuel cell battery 51, wherein when the fuel cell battery is at the voltage level Vis, the fuel cell battery 51 has the worst acceptable conversion efficiency of the fuel cell battery 51. In FIG. 6, when the voltage of the rechargeable battery 53 does not exceed the voltage Vos, i.e. the rechargeable battery 53 is not of full charge, the fuel cell battery 51 outputs the voltage Vis, i.e. the fuel cell battery 51 has the worst acceptable conversion efficiency. When the voltage of the rechargeable battery 53 is equal to the voltage Vos, the output voltage of the DC-DC converter 52 is fixed to voltage Vos. The fuel cell battery 51 increases the output voltage according to the required power of the loader 57, thus, the output power of the fuel cell battery 51 decreases and the performance of the fuel cell battery 51 increases.

Figure 7:
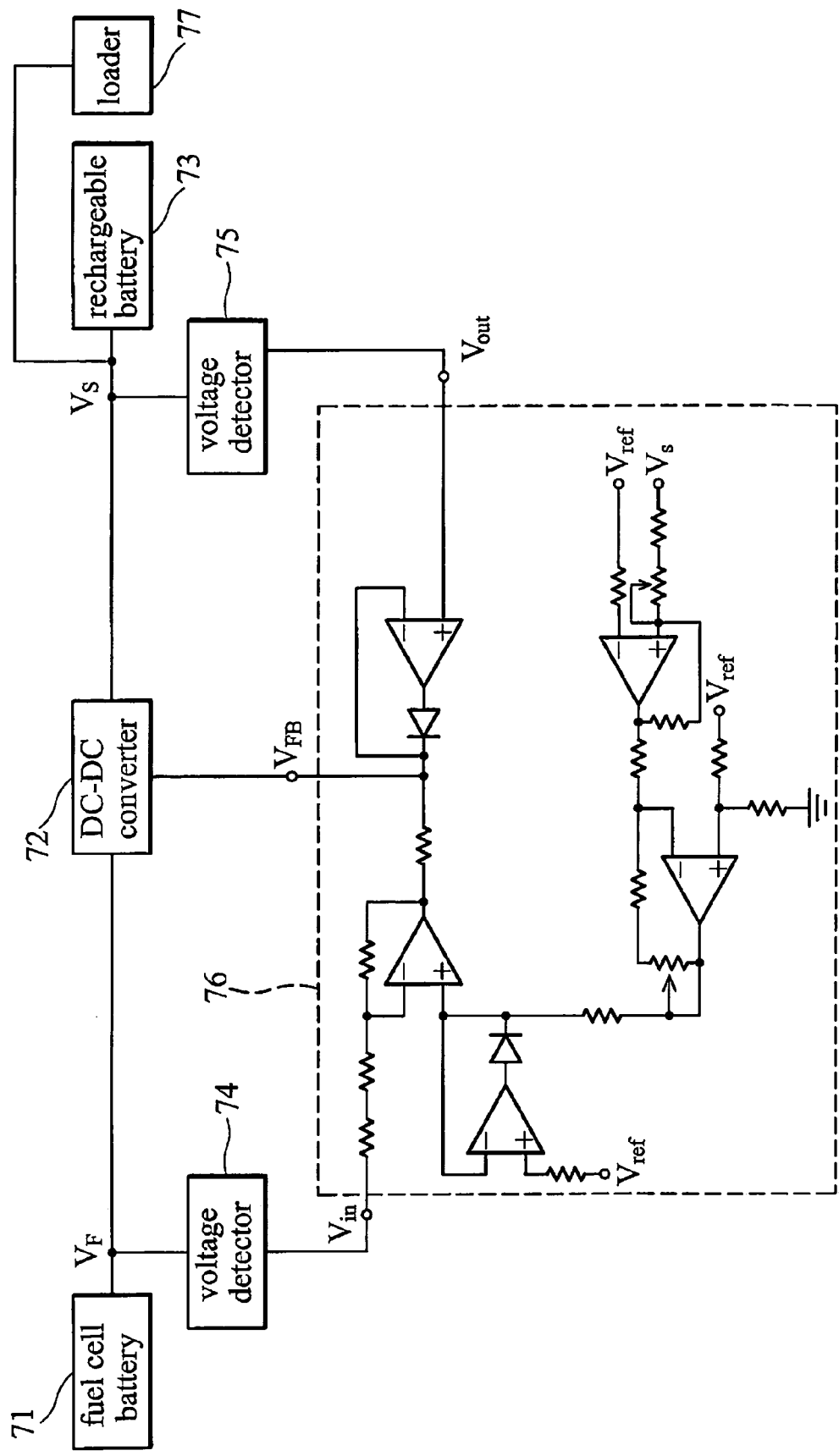
FIG. 7 is a schematic diagram of another embodiment of the hybrid power system of the invention.

FIG. 7 is a schematic diagram of another embodiment of the hybrid power system of the invention. In this embodiment, the circuit of the control unit 76 is merely provided as an example for the purpose of illustration, and is not intended to limit the control unit 76. The voltage measurement unit 74 detects and transforms the voltage $V_F$ of the fuel cell battery 71 into a voltage signal Vin, and the voltage measurement unit 75 detects and transforms the voltage $V_S$ of the rechargeable battery 73 into a voltage signal Vout. In this embodiment, $V_F$ is equal to Vout.

To increase the performance of the fuel cell battery 71, a multiple point control method is applied to the voltage of the fuel cell battery 71. In this embodiment, the fuel cell battery 71 provides two control voltages. When the voltage Vs does not exceed 11.4V, the first control voltage of the rechargeable battery 73, wherein the voltage of each Lithium-ion cell is 3.8V, the DC-DC converter 72 controls the output voltage of the fuel cell battery 71 and the voltage Vin stays at 8V. When the voltage Vs is between 11.4V and 12.25V, the second control voltage of the rechargeable battery 73, the voltage of the fuel cell battery 71 increases in a specific proportion from 8V to 11.2V by a transform circuit, wherein 8V is the lowest working voltage of the fuel cell battery 71, wherein the voltage of each fuel cell is equal to 0.25V, and 11.2V is the corresponding voltage of the fuel cell battery 71 when the rechargeable battery 73 is at full charge, wherein the voltage of each fuel cell is equal to 0.35V. When the voltage Vs is equal to 12.25V, i.e. the voltage of each Lithium-ion cell is 4.08V, the output voltage of the DC-DC converter 72 is fixed to 12.25V. In this embodiment, the voltage of fuel cell battery 71 varies based on the power of loader and the output voltage of DC-DC converter is fixed to 12.25V when the rechargeable battery 73 is of full charge, i.e. the voltage of the rechargeable battery 73 is equal to 12.25V. When the voltage of the rechargeable battery 73 does not exceed a predetermined voltage, the fuel cell battery 71 outputs a predetermined lowest voltage to provide the rechargeable battery 73 maximum power for rapid charging. When the voltage of the rechargeable battery 73 exceeds the first control voltage, the voltage of the fuel cell battery 71 increases and the output power of the fuel cell battery 71 decreases. Thus, the performance and the conversion efficiency of the fuel cell battery 71 increased.

Figure 8:
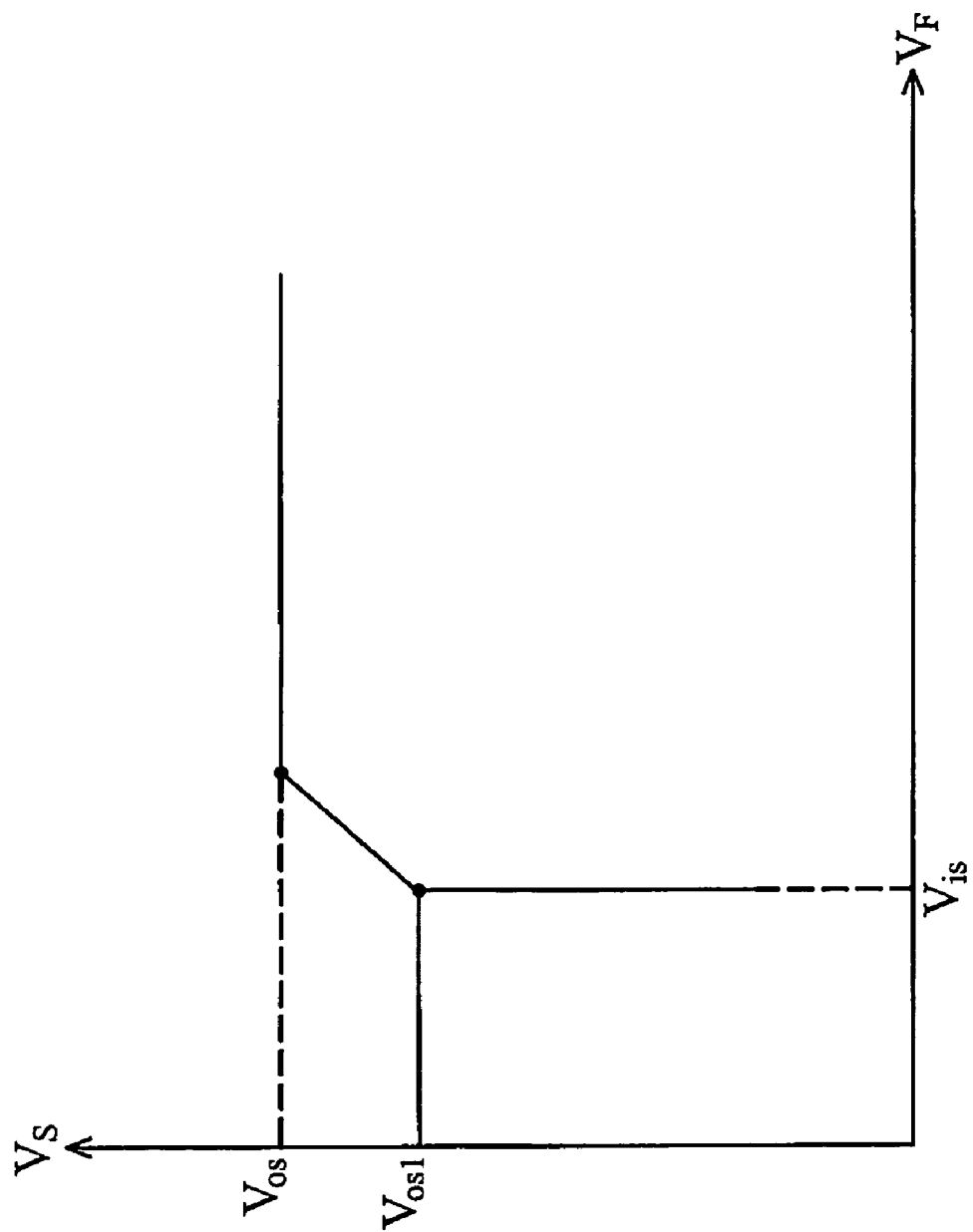
FIG. 8 is a schematic diagram of the variation of the voltage $V_F$ of the fuel cell battery 71 and the voltage Vs of the rechargeable battery 73 of FIG. 7.

FIG. 8 is a schematic diagram of the variation of the voltage $V_F$ of the fuel cell battery 71 and the voltage Vs of the rechargeable battery 73 of FIG. 7, wherein voltage Vos is a cutoff voltage of the rechargeable battery 73, i.e. the at full charge voltage of the rechargeable battery 73, voltage $V_{OS1}$ is a control voltage of the rechargeable battery, and voltage Vis is a predetermined lowest voltage of the fuel cell battery 71, wherein when the fuel cell battery is at the voltage level Vis, the fuel cell battery 71 has the worst acceptable conversion efficiency of the fuel cell battery 71. In FIG. 8, when the voltage of the rechargeable battery 73 does not exceed the control voltage $V_{OS1}$, the output voltage of the fuel cell battery 71 stays at the lowest working voltage, 8V. When the voltage of the rechargeable battery 73 is between the voltage $V_{OS1}$ and the voltage $V_{OS}$, the output voltage of fuel cell battery 71 increases. When the voltage of the rechargeable battery 73 is equal to the voltage $V_{OS}$, the output voltage of the DC-DC converter 72 is fixed at the voltage $V_{OS}$. Although the described method increases the time required to charge the rechargeable battery 73, the operating efficiency of the fuel cell battery 71 increases based on the characteristic of the fuel cell battery.

Figure 9:
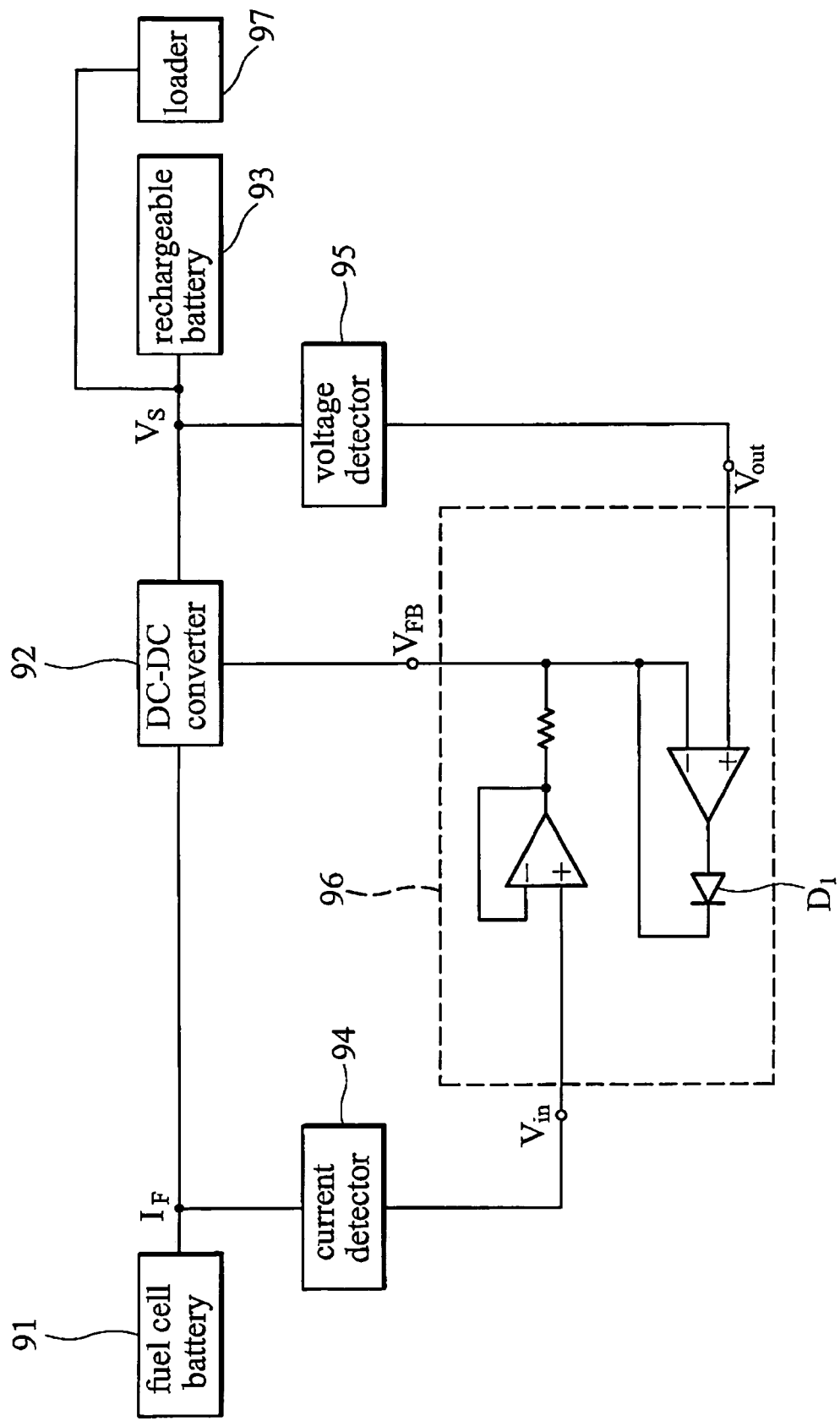
FIG. 9 is a schematic diagram of the third embodiment of the hybrid power system of the invention.

FIG. 9 is a schematic diagram of the third embodiment of the of the hybrid power system of the invention. In this embodiment, the circuit of the control unit 96 is merely provided as an example for the purpose of illustration, and is not intended to limit the control unit 96. The current measurement unit 94 detects and transforms the current $I_F$ of the fuel cell battery 91 into a voltage signal Vin, and the voltage measurement unit 95 detects and transforms the voltage $V_S$ of the rechargeable battery 93 into a voltage signal Vout. In this embodiment, the current detector 94 can be formed of a Hall element capable of directly detecting the current of fuel cell battery 91, or by measuring a voltage drop of a resistor which the output current $I_F$ of fuel cell battery 91 passes by, and then transmitting the voltage signal Vin to the control unit 96.

In this embodiment, the maximum current of the fuel cell battery 91 is 1.2 A and the corresponding voltage is 2.5V. The operation of the control unit 96 is similar to the control unit 56 of FIG. 5, and the only difference is the control unit 56 operates based on the voltage of fuel cell battery 51 and the control unit 96 operating based on the current of the fuel cell battery 91. When the voltage $V_S$ exceeds 12.25V, the at full charge voltage of the rechargeable battery 93, the voltage signal Vout exceeds 2.5V, thus, the diode D1 turns on and the feedback voltage $V_{FB}$ is equal to Vout. The fuel cell battery 91 the decreases the electric energy output to the DC-DC converter 52 according to the feedback voltage $V_{FB}$ until the voltage of rechargeable battery 93 is equal to 12.25 V. When the voltage Vout does not exceed 12.25V, the fuel cell battery 91 outputs the maximum current 1.2 A, i.e. the minimum voltage 2.5V, to the DC-DC converter 92. When the fuel cell battery 91 outputs the maximum current 1.2 A, the fuel cell battery 91 has the worst acceptable conversion efficiency of the fuel cell battery 91. When the rechargeable battery is at full charge, the output current $I_F$ of the fuel cell battery 91 varies according to the power of the loader 97 and the DC-C converter outputs a constant voltage. When the secondary is not at full charge, the fuel cell battery 91 outputs the maximum current to provide a maximum for rapid charging.

Figure 10:
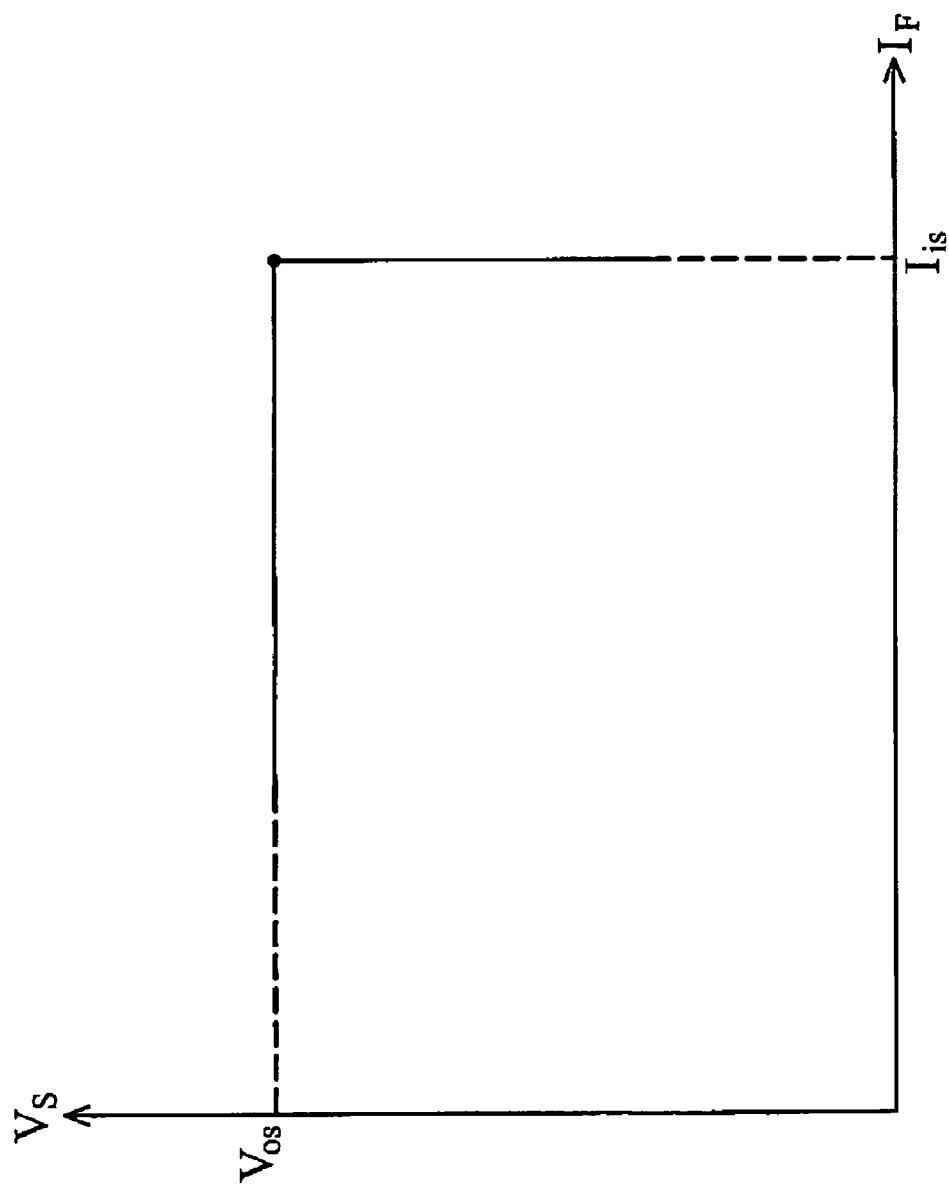
FIG. 10 is a schematic diagram of the variation of the current $I_F$ of the fuel cell battery 91 and the voltage Vs of the rechargeable battery 93 of FIG. 9.

FIG. 10 is a schematic diagram of the variation of the current $I_F$ of the fuel cell battery 91 and the voltage Vs of the rechargeable battery 93 of FIG. 9, wherein voltage Vos is a cutoff voltage of the rechargeable battery 93, the current Iis is a predetermined maximum current and when the fuel cell battery 91 outputs the maximum current, the fuel cell battery 91 has the worst acceptable conversion efficiency. When the voltage of the rechargeable battery 93 does not exceed Vos, the fuel cell battery 91 outputs the current Iis, i.e. the maximum power. When the voltage of the rechargeable battery 93 is equal to Vos, the output voltage of the DC-DC converter is fixed at Vos and the fuel cell battery decreases the output power according to the loader 97 to increase the operating efficiency of the fuel cell battery 91.

Figure 11:
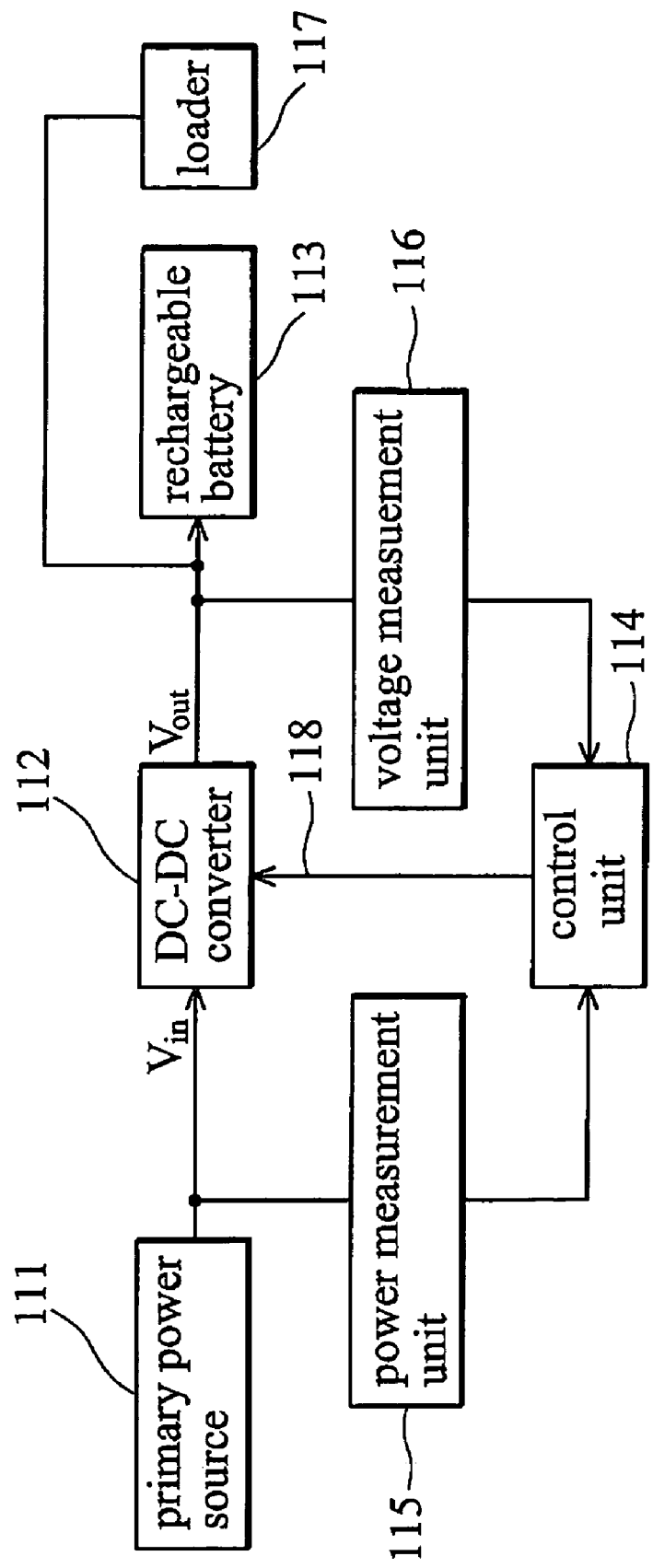
FIG. 11 is a schematic diagram of the fourth embodiment of the hybrid power system of the invention.

FIG. 11 is a schematic diagram of the fourth embodiment of the hybrid power system of the invention. The power measurement unit 11 measures and transforms the power of fuel cell battery 111 into a voltage signal and the voltage measurement 116 measures and transforms the voltage of the rechargeable battery 113 into a voltage signal. The control unit 114 receives the voltage signal from the power measurement unit 11 and the voltage measurement 116 to generate a control signal 118. In this embodiment, the maximum output power of the fuel cell battery 111 is 10 W and the corresponding voltage is 2.5V. When the voltage of the rechargeable battery 113 does not exceed 12.25V, the fuel cell battery 111 outputs the maximum power to the DC-DC converter 112 according to the control signal from the control unit 114. In this embodiment, a multiple point control method also can be applied to the voltage of the fuel cell battery 111. When the voltage of the rechargeable battery 113 is between 11.4V and 12.25V, the control signal 118 controls the fuel cell battery 111 decreasing the power output to the DC-DC converter 112. When the voltage of the rechargeable battery 113 is equal to 12.25V, i.e. the full charge voltage of the rechargeable battery 113, the output voltage of the fuel cell battery 111 varies according to the power of the loader 117, and the DC-DC converter 112 outputs a constant voltage. When the voltage of the rechargeable battery does not exceed a first control voltage, i.e. 11.4V, the fuel cell battery 111 outputs the maximum power to the DC-DC converter 112 charging of rechargeable battery 113 rapid. When the voltage of the rechargeable battery 113 exceeds the first control voltage, the voltage of the fuel cell battery 111 increases and the output power of the fuel cell battery 111 decreases. Thus, the performance and the conversion efficiency of the fuel cell battery 111 increases.

Figure 12:
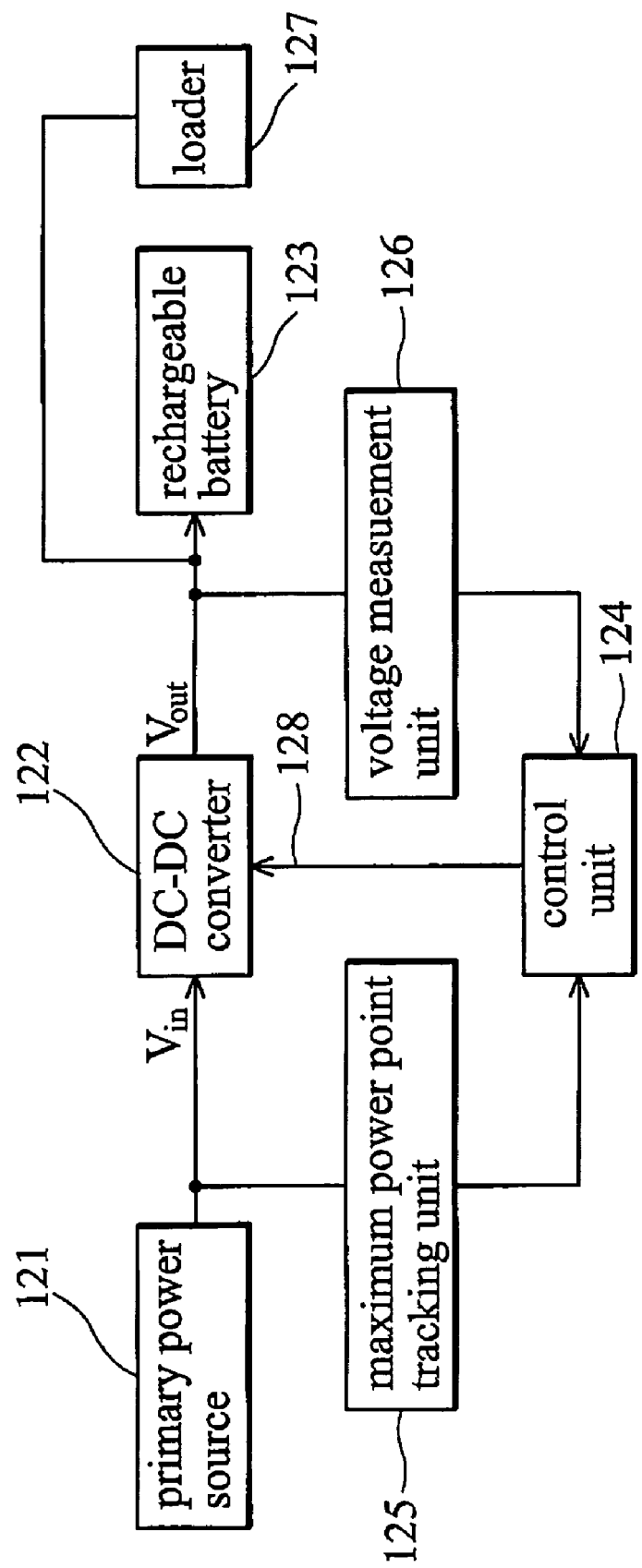
FIG. 12 is a schematic diagram of the fifth embodiment of the hybrid power system of the invention.

FIG. 12 is a schematic diagram of the fifth embodiment of the hybrid power system of the invention. In this embodiment, a maximum power point tracking (MPPT) unit 125 is applied to track the maximum power point of the fuel cell battery 121. The control unit 124 generates a control signal to control the DC-DC converter 122 according to a first voltage signal from the MPPT unit 125 and a second voltage signal from the voltage measurement unit 126. When the rechargeable battery 123 is at full charge, the output voltage of the DC-DC converter 122 is fixed according to the control signal 128 from the control unit 124 and the output power of the fuel cell battery 121 is determined by the loader 127. When the voltage of the rechargeable battery 123 does not exceed a predetermined value, the fuel cell battery 121 outputs the maximum power to the DC-DC converter 122 for rapid of charge the rechargeable battery 123.

Figure 13:
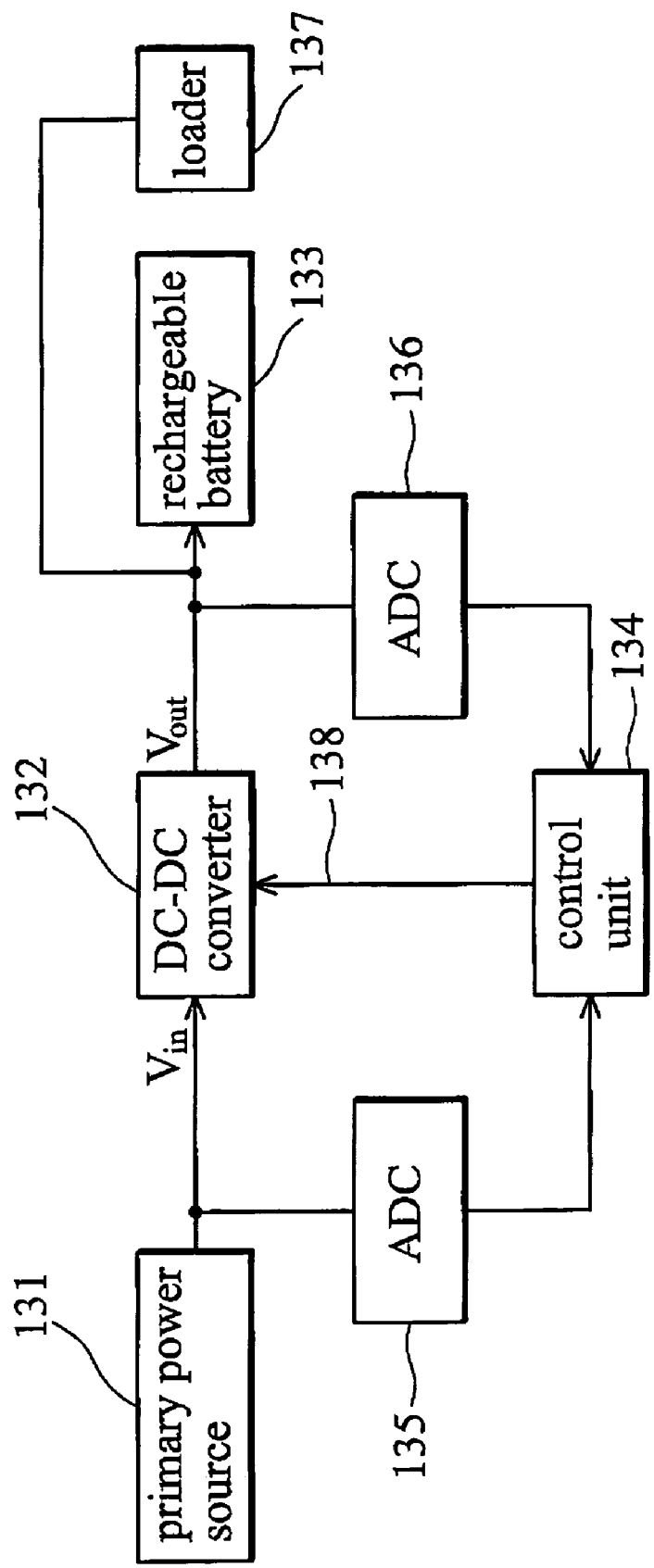
FIG. 13 is a schematic diagram of the sixth embodiment of the hybrid power system of the invention.

FIG. 13 is a schematic diagram of the sixth embodiment of the hybrid power system of the invention. The difference between this embodiment and the described embodiments is the operation type which is changed from analog to digital. The analog-to-digital converters (ADCs) 135 and 136 respectively detect and transform the electric parameters of the fuel cell battery 131 and the secondary 133, such as voltage, current or power, into digital signals. The control unit 134, such as a microprocessor or a DSP chip, receives the digital signals from ADCs 135 and 136 and then an output signal is generated. The output signal is transformed into the control signal 138 through a digital-to analog converter (not shown in FIG. 13) to control the DC-DC converter 132. The operation of FIG. 13 reduces circuit complexities, and the control type of the control unit can be easily changed by renewing the firmware or the software. Furthermore, the digital control can control the electric parameter of the fuel cell battery 131 and the secondary 133, such as voltage, current or power, more precisely and the multiple point control of the fuel cell battery 131 can be more easily applied to the digital control.

Figure 14:
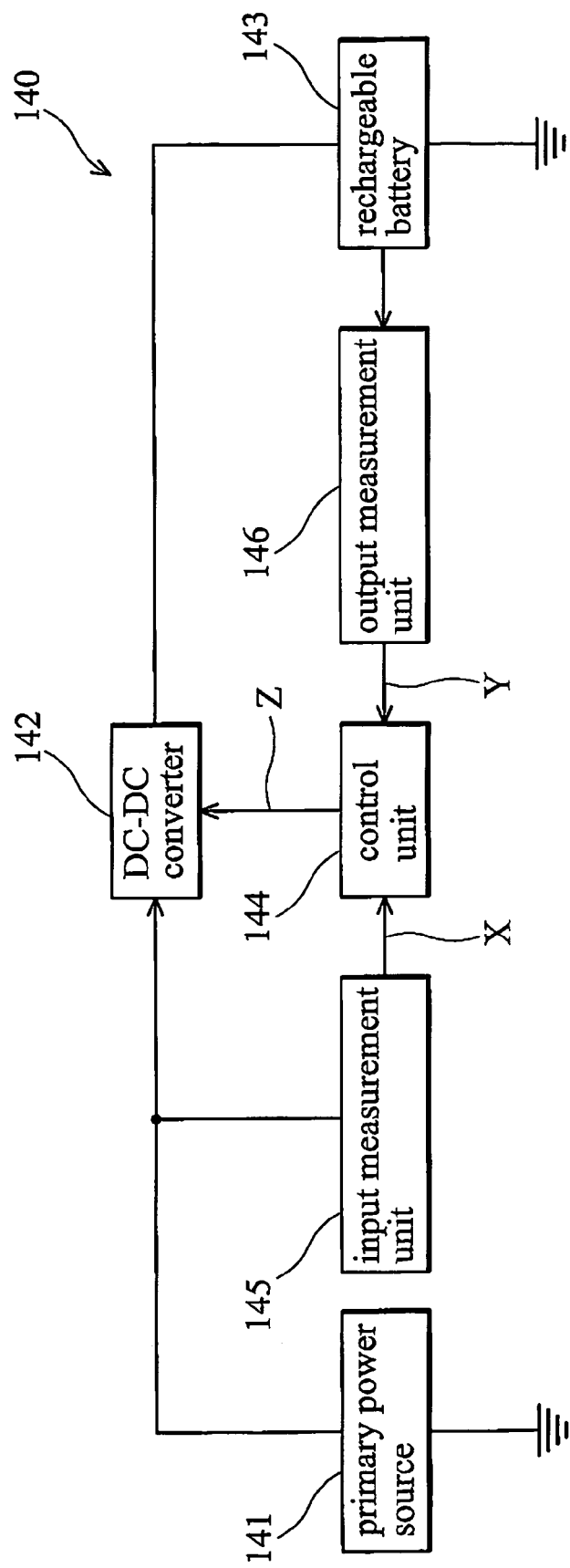
FIG. 14 is a schematic diagram of the seventh embodiment of the hybrid power system of the invention.

FIG. 14 is a schematic diagram of the seventh embodiment of the hybrid power system of the invention. The hybrid power supply 140 comprises a primary power source 141 and a rechargeable battery 143, wherein the rechargeable battery 143 comprises one or a plurality of secondary cells. The hybrid power supply further comprises a DC-DC converter 142 controlled by a control signal Z from the control unit 144 for adjusting the input and the output of the DC-DC converter 142. The control unit 144 receives a first signal X from the input measurement unit 145 and a second signal Y from the output measurement unit 146 to generate and transmit the control signal Z to the DC-DC converter 142. The input measurement unit 145 coupled to the primary power source 141 measures and transforms the voltage, current or power of the primary power source into the first signal X. The output measurement unit 146 coupled to the rechargeable battery 143 measures and transforms the total voltage of the rechargeable battery 143, the voltage of signal secondary cell or the energy level of the rechargeable battery into the second signal Y.

Figure 15:
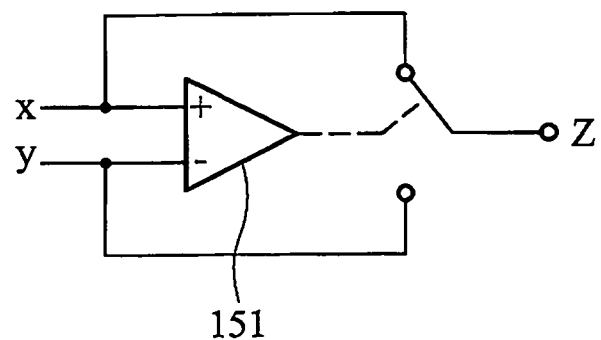
FIG. 15 is a schematic diagram of an embodiment of the control unit 144 of FIG. 14.

FIG. 15 is a schematic diagram of an embodiment of the control unit 144 of FIG. 14. The control signal Z is determined to the first signal X or the second signal Y by a comparator 151 receiving the first signal X and the second signal Y. When the power stored in the rechargeable battery does not exceed a first predetermined value, the control signal Z is the second signal Y. When the energy level of the rechargeable battery exceeds a second predetermined value, the control signal Z is the first signal X. The DC-DC converter 142 receives a predetermined voltage, current or power from the primary power source 141 according to the control signal Z from the control unit 144 when the energy level of the rechargeable battery does not exceed a first predetermined value. When the energy level of the rechargeable battery exceeds a second predetermined value, the DC-DC converter 142 outputs a predetermined voltage to the rechargeable battery 143.

Figure 16:
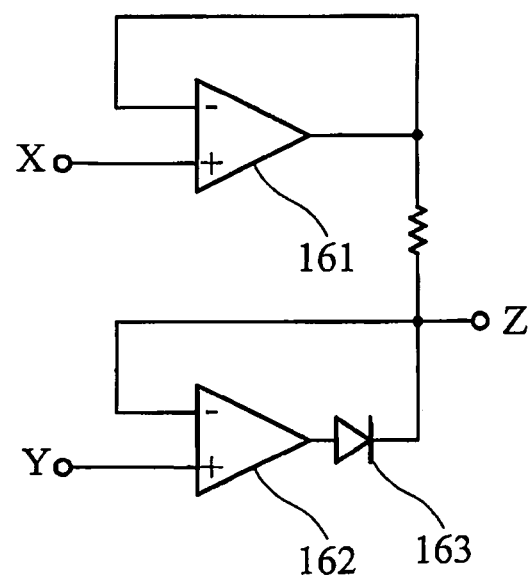
FIG. 16 is a schematic diagram of another embodiment of the control unit 144 of FIG. 14.

FIG. 16 is a schematic diagram of another embodiment of the control unit 144 of FIG. 14. In FIG. 16, the diode 163, the operation amplifier 161 and 162 are used to compare the first signal X and the second signal Y and the control signal Z is the larger of the first signal X and the second signal Y. When the control signal is the second signal Y, the DC-DC converter 142 outputs a first predetermined voltage. When the control signal Z is the first signal X, the primary power source 141 outputs a second predetermined voltage, current or power to the DC-DC converter.

Figure 17:
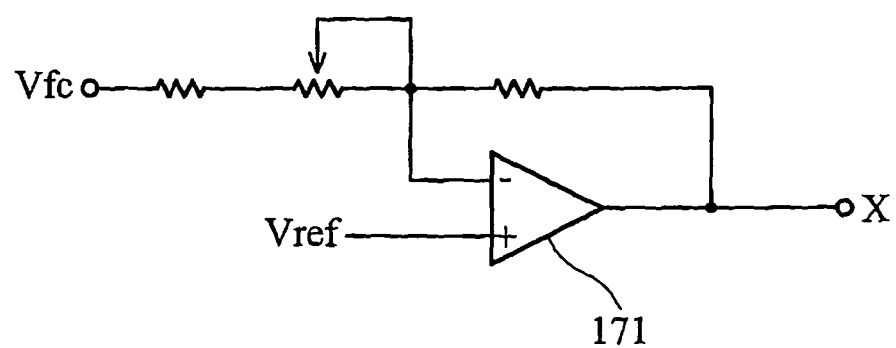
FIG. 17 is a circuit diagram of an embodiment of the input measurement unit 145 of the FIG. 14.
Figure 18:
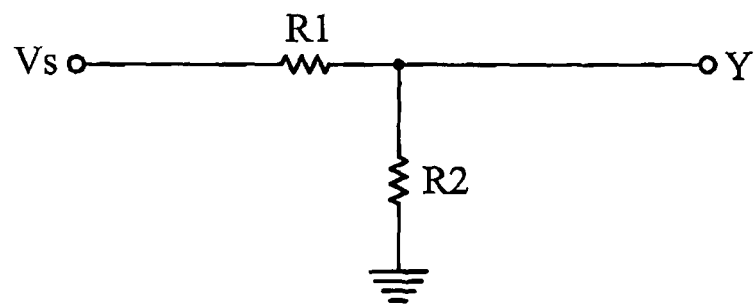
FIG. 18 is a circuit diagram of an embodiment of the input measurement unit 146 of the FIG. 14

FIG. 17 is a circuit diagram of an embodiment of the input measurement unit 145 of the FIG. 14. The first signal X is generated by comparing the voltage Vfc of the primary power source 141 and a reference voltage Vref. FIG. 18 is a circuit diagram of an embodiment of the input measurement unit 146 of the FIG. 14. The second signal Y is generated by dividing the voltage of the rechargeable battery 143 Vs by the resistors R1 and R2. The circuit of FIG. 17 of the input measurement unit 145 and the circuit of FIG. 18 of the input measurement unit 146 are merely provided as an example for the purpose of illustration, and is not intended to limit the invention thereto. The input measurement unit of FIG. 17 is a voltage measurement unit, and a current measurement unit or a power measurement unit also can be applied to the input measurement unit of FIG. 17. The output measurement unit of FIG. 18 is a voltage measurement unit for measuring the total voltage of the rechargeable battery 143 or single secondary cell unit of the rechargeable battery 143. Furthermore, an electric quantity measurement unit also can be applied to the output measurement unit of FIG. 18.

Figure 19:
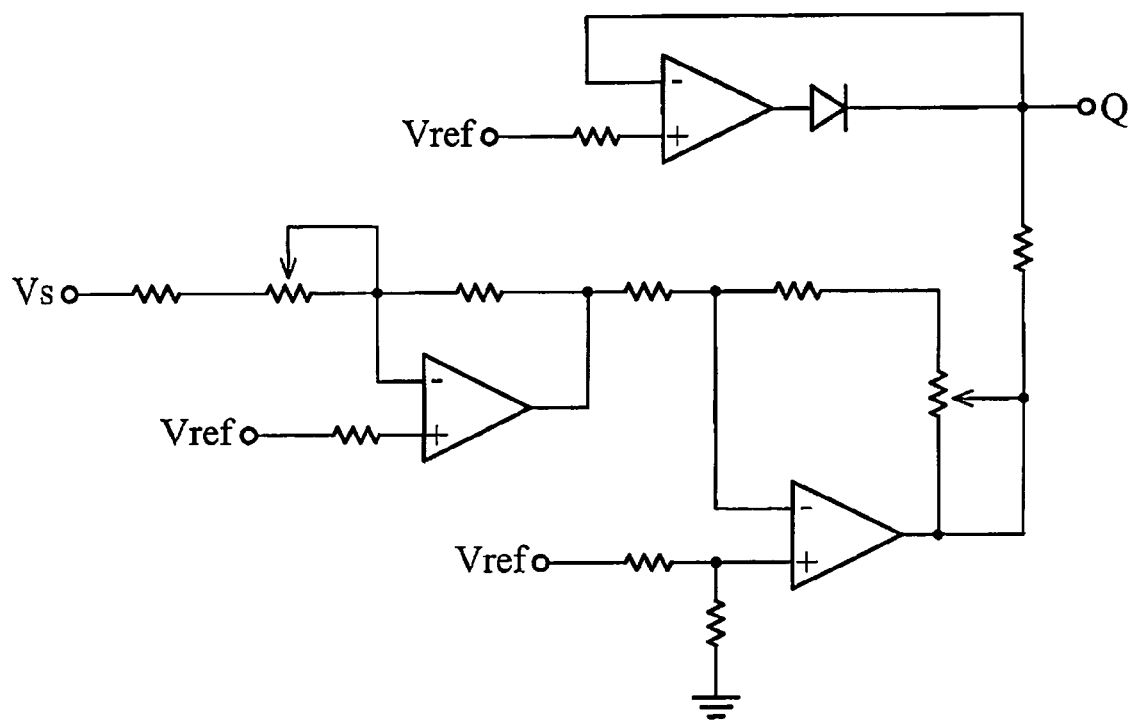
FIG. 19 is a circuit diagram of an embodiment of a feedback signal generating circuit of the invention.
Figure 20:
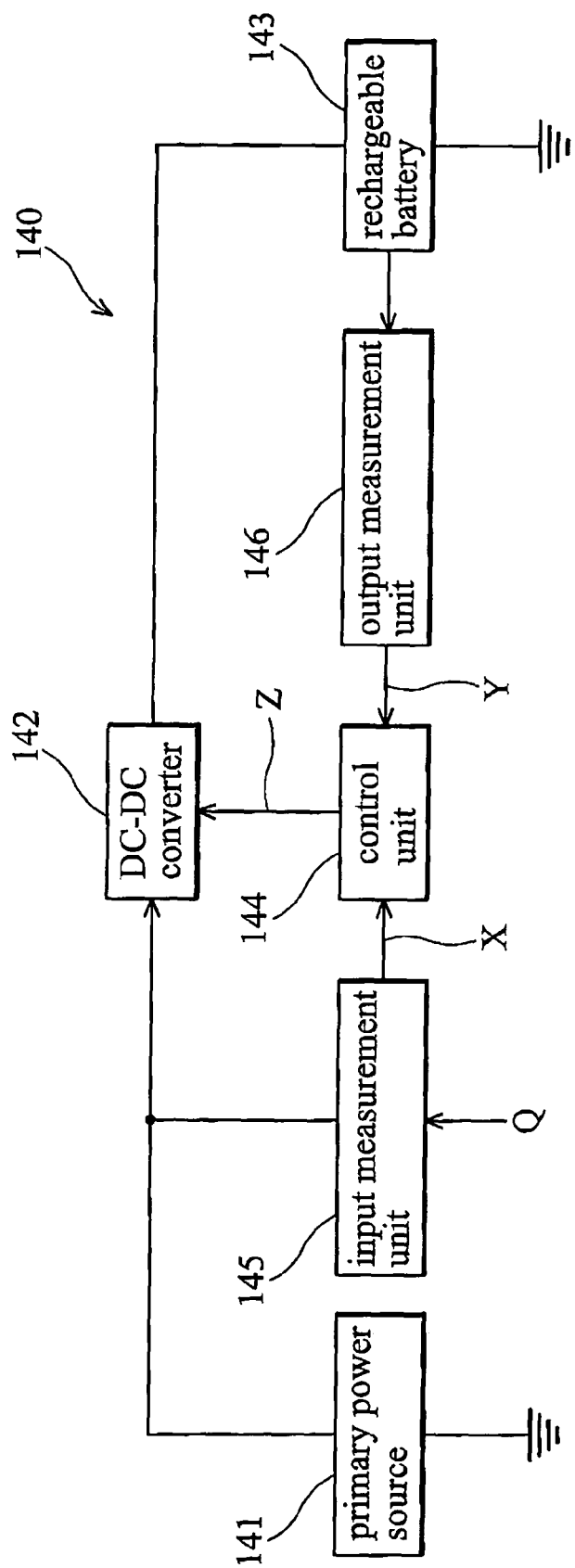
FIG. 20 is a schematic diagram of the hybrid power supply of FIG. 14 with a feedback signal Q applied to the input measurement unit 145.
Figure 21:
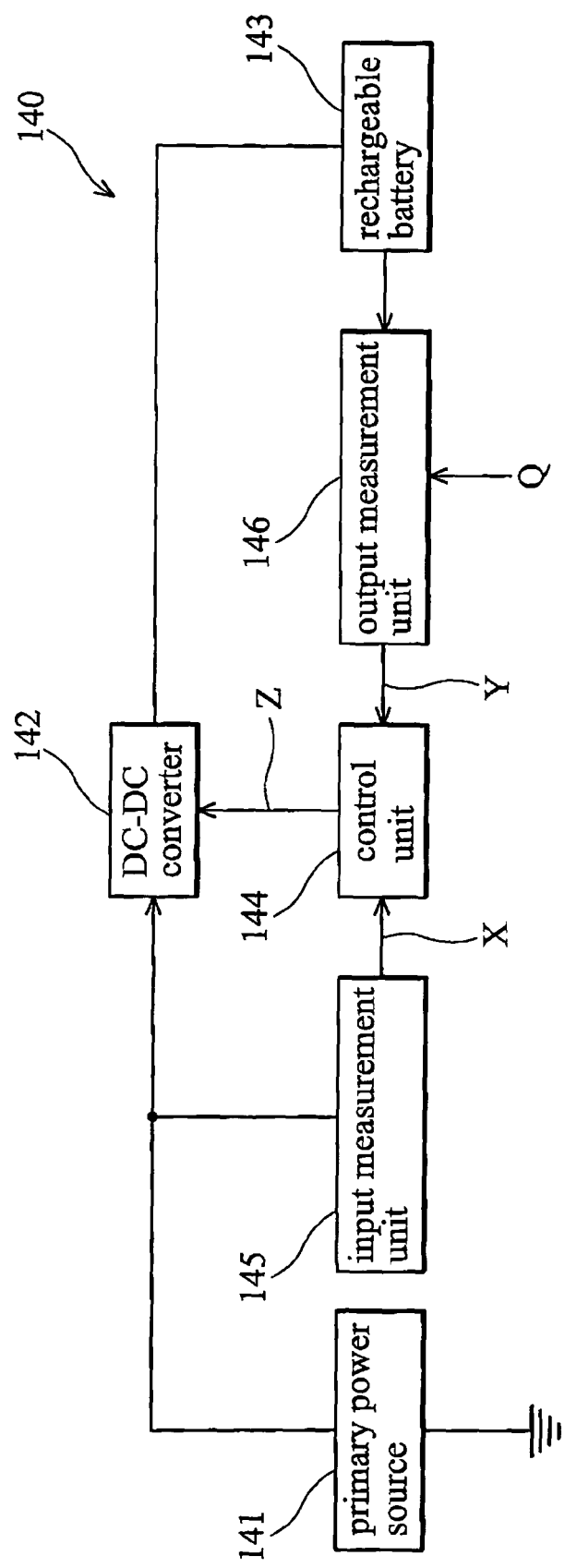
FIG. 21 is a schematic diagram of the hybrid power supply of FIG. 14 with a feedback signal Q applied to the output measurement unit 146.

The invention further provides a feedback signal generating circuit for the better control. FIG. 19 is a circuit diagram of an embodiment of a feedback signal generating circuit of the invention. In the invention, the feedback voltage is the total voltage Vs of the rechargeable battery 143 and a feedback signal Q is generated by comparing the feedback voltage Vs and a reference voltage Vref by a comparator. The reference voltage Vref of FIG. 17 can be substituted for the feedback signal Q to adjust the first signal X, such as shown in the FIG. 20. Thus, the voltage, current or power of the primary power source 141 output to the DC-DC converter 142 can be adjusted by the feedback control signal Q when the energy level of the rechargeable battery 143 is between the first predetermined value and the second predetermined value. FIG. 21 is a schematic diagram of the hybrid power supply of FIG. 14 with a feedback signal Q applied to the output measurement unit 146. The total voltage Vs of the secondary of the feedback signal generating circuit of FIG. 19 can be substituted for the voltage Vfc of the primary power source 141 and the feedback signal Q is generated by comparing the voltage Vfc and the voltage Vref. Thus, the voltage, current or power of the primary power source 141 output to the DC-DC converter 142 can be adjusted by the feedback control signal Q when the energy level of the rechargeable battery 143 is between the first predetermined value and the second predetermined value.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power management method for a hybrid power supply, comprising:
   providing a rechargeable battery;
   providing a fuel cell;
   providing a DC-DC converter directly connected to the fuel cell;
   providing a control unit;
   acquiring an amount of energy stored in the rechargeable battery to determine an energy level of the rechargeable battery;
   when the energy level of the rechargeable battery does not exceed a first predetermined value, controlling the fuel cell to output a first voltage to the DC-DC converter; and
   controlling the DC-DC converter to output a second voltage to the rechargeable battery when the energy level of the rechargeable battery is equal to or exceeds a second predetermined value,
   wherein when the energy level of the rechargeable battery is between the first predetermined value and the second predetermined value, the control unit controls the fuel cell to increase the voltage output of the fuel cell to the DC-DC converter according to the increasing energy level of the rechargeable battery.

2. The method as claimed in claim 1, wherein when the energy level of the rechargeable battery is equal to or exceeds the second predetermined value, an energy transmission between the fuel cell and the DC-DC converter is stopped.

3. The method as claimed in claim 1, further comprising:
   providing a voltage-energy level table of the rechargeable battery; and
   detecting a voltage of the rechargeable battery to find the energy level of the rechargeable battery by finding the voltage-energy level table.

4. The method as claimed in claim 1, wherein the first predetermined value is equal to the second predetermined value.

5. A hybrid power supply device, comprising:
   a fuel cell having an energy output terminal;
   a rechargeable battery having an energy input/output terminal;
   a control unit acquiring an electrical state of the fuel cell and an energy level of the rechargeable battery to output a control signal; and
   a DC-DC converter having a first input terminal directly connected to the energy output terminal of the fuel cell, a first output terminal coupled to the energy input terminal of the rechargeable battery, a control terminal receiving the control signal from the control unit, wherein when the energy level of the rechargeable battery does not exceed a first predetermined value, the control unit controls the fuel cell to output a first voltage to the first input terminal of DC/DC converter, and when the energy level of the rechargeable battery is equal to or exceeds a second predetermined value, the control unit controls the DC-DC converter to output a second voltage to the rechargeable battery,
   wherein when the energy level of the rechargeable battery is between the first predetermined value and the second predetermined value, the control units generates the control signal to control the fuel cell to increase the voltage output of the fuel cell to the DC-DC converter according to the increasing energy level of the rechargeable battery.

6. The device as claimed in claim 5, wherein the first value is equal to the second value.

7. The device as claimed in claim 5, further comprising:
a first state detector to detect and transform the voltage of the fuel cell into a first state signal; and
a second state detector to detect and transform the energy level of the rechargeable battery into a second state signal.

8. The device as claimed in claim 7, wherein the second state detector is a voltage measurement unit.

9. The device as claimed in claim 7, wherein the first state signal is a voltage signal.

10. The device as claimed in claim 7, wherein the second state signal is a voltage signal.

11. The device as claimed in claim 7, wherein the rechargeable battery is formed by a Lithium-ion rechargeable battery, a Ni—H rechargeable battery, or a Lead-acid battery.

12. A hybrid power supply device, comprising:
a fuel cell;
an input measurement unit electrically connected to the fuel cell to output a first signal according to the voltage of the primary power source;
a rechargeable battery having one or a plurality of secondary cell units;
an output measurement unit electrically connected to the rechargeable battery to output a second signal according to the energy level of the rechargeable battery;
a control unit receiving the first signal and the second signal to output a third signal, wherein the third signal is one of the first and the second signals; and
a DC-DC converter directly and electrically connected to the fuel cell and the rechargeable battery, wherein the DC-DC converter receives an input voltage from the fuel cell and an output voltage of the DC-DC converter is adjusted based on the third signal; when the energy level of the rechargeable battery does not exceed a first predetermined value, the DC-DC converter controls the fuel cell to output a first voltage based on the third signal, when the energy level of the rechargeable battery exceeds a second predetermined value, the DC-DC converter outputs a second voltage based on the third signal,
wherein when the energy level of the rechargeable battery is between the first predetermined value and the second predetermined value, the third signal controls the DC-DC converter to increase the voltage output of the fuel cell to the DC-DC converter.

13. The device as claimed in claim 12, wherein the control unit comprises a comparator, when the second signal exceeds a reference signal, the third signal is set as the first signal, and when the second signal does not exceed the reference signal, the third signal is set as the second signal.

14. The device as claimed in claim 12, wherein the control unit comprises a comparator comparing the first signal and the second signal to determine the third signal is as much as the first signal or the second signal according to the result.

15. The device as claimed in claim 12, further comprising a control signal generating circuit receiving a reference signal and the second signal, outputting a control signal to adjust the third signal.

16. The device as claimed in claim 15, wherein the input measurement unit adjusts the first signal according to the control signal.

17. The method as claimed in claim 1, wherein the fuel cell battery is formed of direct methanol fuel cells.

* * * * *